United States Patent
Uchida et al.

(10) Patent No.: US 8,960,978 B2
(45) Date of Patent: Feb. 24, 2015

(54) VEHICULAR LAMP

(71) Applicant: Koito Manufacturing Co., Ltd., Minato-ku, Tokyo (JP)

(72) Inventors: Naoki Uchida, Shizuoka (JP); Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 1 day.

(21) Appl. No.: 13/906,103

(22) Filed: May 30, 2013

(65) Prior Publication Data

US 2013/0322105 A1   Dec. 5, 2013

(30) Foreign Application Priority Data

Jun. 5, 2012  (JP) ................. 2012-128301

(51) Int. Cl.
*B60Q 1/16* (2006.01)
*F21S 8/10* (2006.01)

(52) U.S. Cl.
CPC ............... *B60Q 1/16* (2013.01); *F21S 48/1154* (2013.01); *F21S 48/1159* (2013.01); *F21S 48/1291* (2013.01); *F21S 48/1329* (2013.01); *F21S 48/1388* (2013.01); *F21S 48/1394* (2013.01)
USPC .......................................... 362/511; 362/545

(58) Field of Classification Search
USPC .......... 362/543, 544, 545, 520, 521, 522, 511
See application file for complete search history.

(56) References Cited

U.S. PATENT DOCUMENTS

| | | | |
|---|---|---|---|
| 7,070,312 B2* | 7/2006 | Tatsukawa | 362/545 |
| 7,181,378 B2* | 2/2007 | Benitez et al. | 703/2 |
| 7,416,322 B2* | 8/2008 | Tanaka et al. | 362/514 |
| 2005/0117125 A1* | 6/2005 | Minano et al. | 353/81 |
| 2008/0316761 A1* | 12/2008 | Minano et al. | 362/518 |
| 2012/0008333 A1* | 1/2012 | Otani | 362/516 |
| 2012/0057363 A1* | 3/2012 | Ishida et al. | 362/516 |
| 2012/0300486 A1* | 11/2012 | Matsushita et al. | 362/521 |

FOREIGN PATENT DOCUMENTS

JP   2005-11704 A   1/2005

* cited by examiner

*Primary Examiner* — Laura Tso
(74) *Attorney, Agent, or Firm* — DLA Piper LLP (US)

(57) ABSTRACT

A vehicular headlamp (100) including a first lamp unit (10) provided with a first LED (11) and a first translucent member (13) internally reflecting light from the first LED (11) twice and then emitting the reflected light, a second lamp unit (20) provided with a second LED (21) and a second translucent member (23) internally reflecting light from the second LED (21) twice and then emitting the reflected light, and a third lamp unit (30) provided with a third LED (31) and a third translucent member (33) internally reflecting light from the third LED (31) twice and then emitting the reflected light. The first translucent member (13), the second translucent member (23), and the third translucent member (33) are coupled together at their ends in the vehicle width direction.

6 Claims, 5 Drawing Sheets

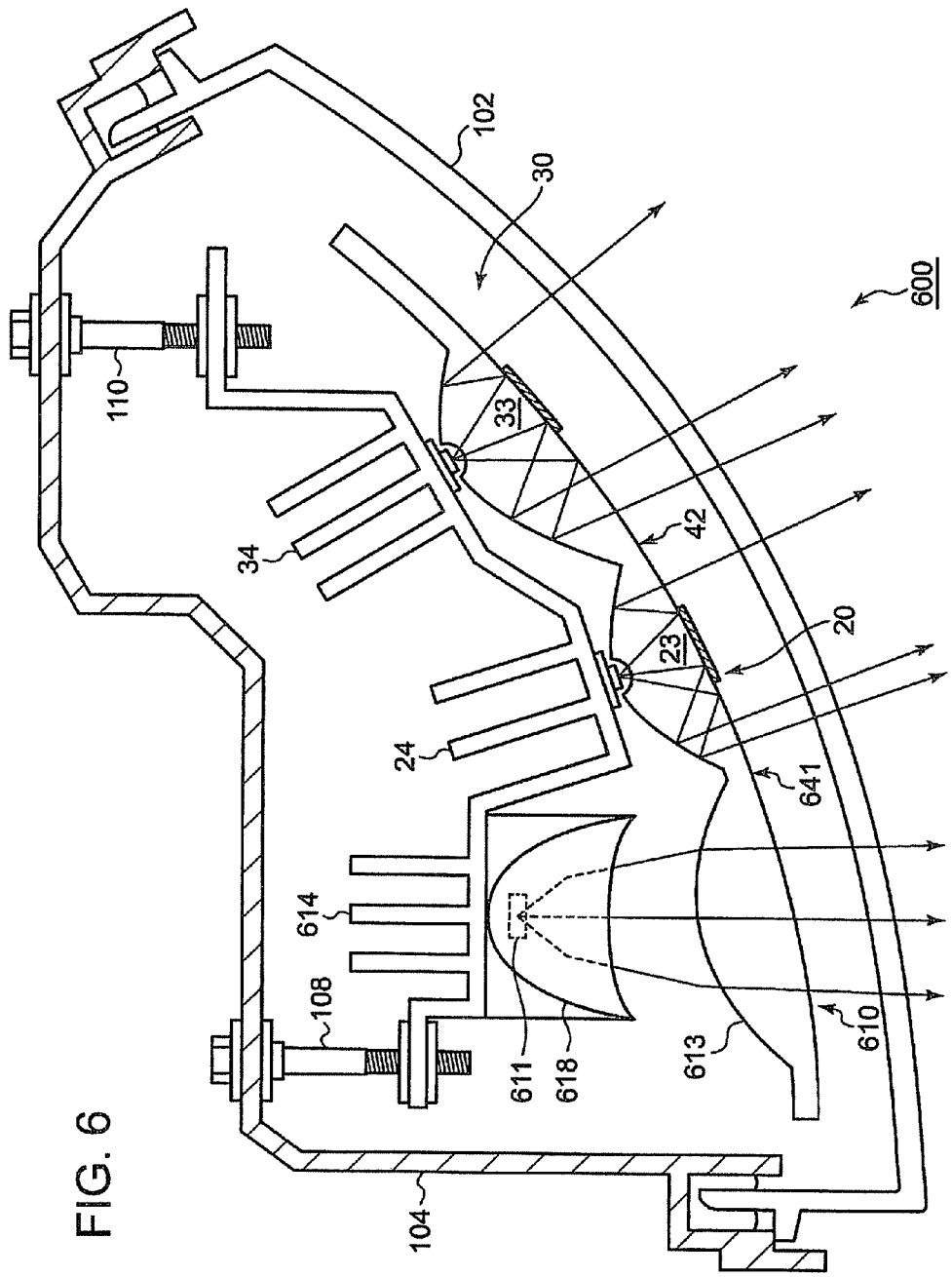

VEHICULAR LAMP

BACKGROUND OF THE INVENTION

1. Field of the Invention

The present invention relates to vehicular lamps.

2. Description of the Related Art

Conventionally, as described in, e.g., Japanese Patent Application Laid-Open (Kokai) No. 2005-11704, lamp units for vehicular headlamps which include a semiconductor light-emitting element and a translucent member on which light from the semiconductor light-emitting element is incident and from which the light is emitted to the front of the lamp are known. Such lamp units are configured so that the light emitted from the semiconductor light-emitting element is incident to the translucent member, and internally reflected on the front surface of the translucent member, and then internally reflected again on the rear surface thereof and finally emitted out from the front surface. In this case, the central area of the front surface of the translucent member is mirror finished in order to internally reflect the light from the semiconductor light-emitting element. Substantially the entire rear surface of the translucent member is mirror finished in order to reflect again the reflected light from the front surface thereof.

Japanese Patent Application Laid-Open (Kokai) No. 2005-11704 discloses a vehicular headlamp that includes a plurality of such lamp units. In this vehicular headlamp, at least one of the lamp units is configured as a lamp unit that forms a horizontal cut-off line of a low-beam distribution pattern, and at least one of the remainder of the lamp units is configured as a lamp unit that forms an oblique cut-off line of a low-beam distribution pattern.

In recent years, not only high performance but also a non-conventional appearance of sophisticated design have been desired for vehicular lamps.

BRIEF SUMMARY OF THE INVENTION

The present invention was developed in view of the above situations, and it is an object of the present invention to provide a vehicular lamp that has a light source and a translucent member for controlling light from the light source and has an appearance of sophisticated design.

In order to accomplish the above object, a vehicular lamp according to one aspect of the present invention includes:
 a first lamp unit comprising a first light source and a first translucent member that receives incident light from the first light source and is configured so that the incident light is internally reflected on a front surface of the translucent member and internally reflected on a rear surface of the translucent member and then emitted from the front surface of the translucent member; and
 a second lamp unit comprising a second light source and a second translucent member that receives incident light from the second light source and is configured so that the incident light is internally reflected on a front surface of the translucent member and internally reflected on a rear surface of the translucent member and then emitted from the front surface of the translucent member; and in this structure,
 the first translucent member and the second translucent member are coupled together at their ends in a vehicle width direction.

In the above-described vehicular lamp of the present invention, the first translucent member and the second translucent member may be integrally molded by a resin material.

The coupled portion of the first translucent member and the second translucent member can be configured so that light is transmitted from one of the translucent members to the other.

The first light source and the second light source can be supported by a common support member.

The first translucent member and the second translucent member can be configured to form different light distribution patterns.

According to the present invention, as seen from the above, a vehicular lamp that includes a light source and a translucent member for controlling the light from the light source has an appearance of sophisticated design.

BRIEF DESCRIPTION OF THE SEVERAL VIEWS OF THE DRAWINGS

FIG. 6 is a horizontal cross-sectional view showing a vehicular headlamp according to another embodiment of the present invention.

DETAILED DESCRIPTION OF THE INVENTION

Hereafter, embodiments of the present invention will be described in detail with reference to the accompanying drawings.

Figure 1:
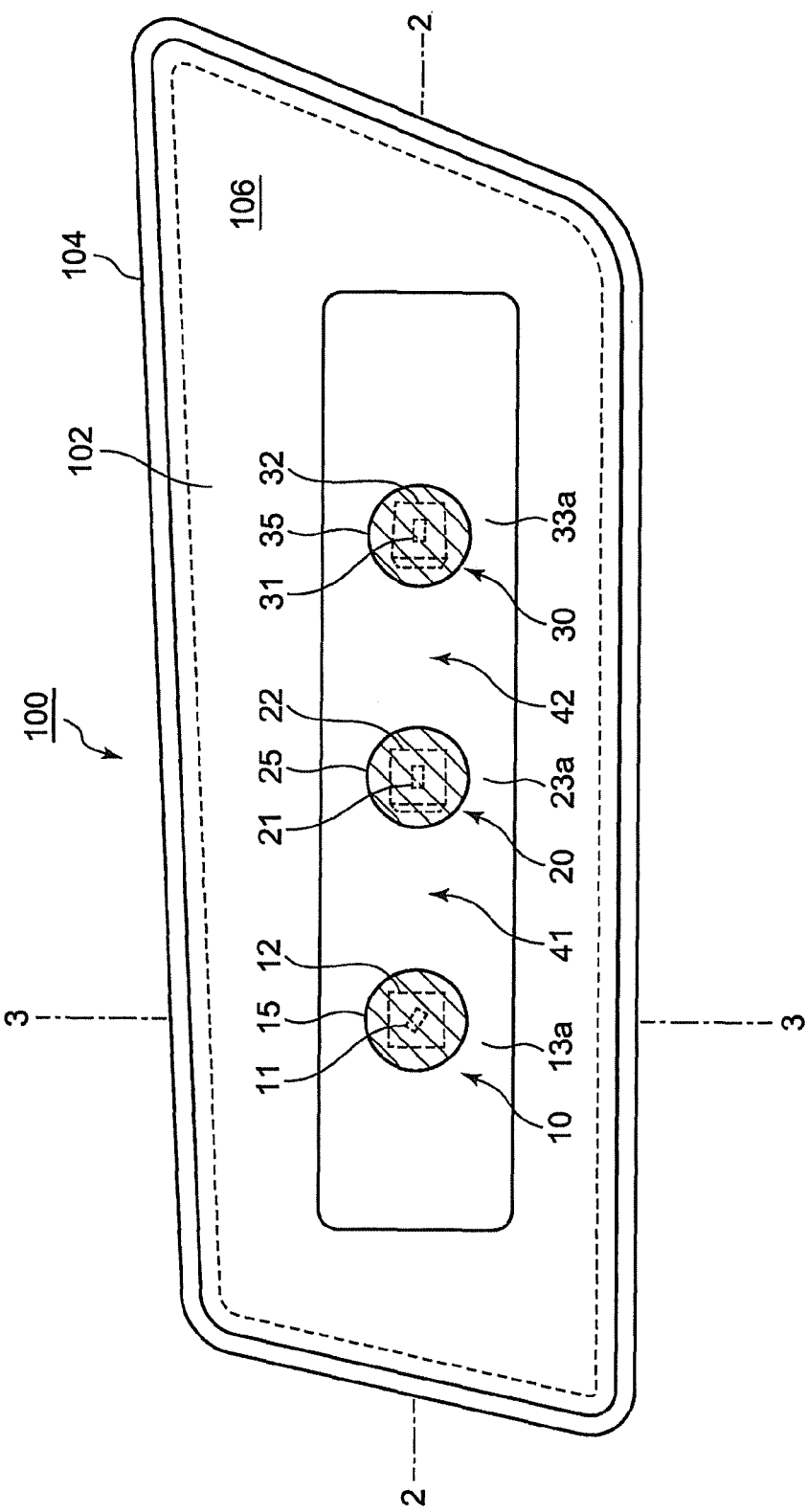
FIG. 1 is a front view showing a vehicular headlamp according to one embodiment of the present invention.
Figure 2:
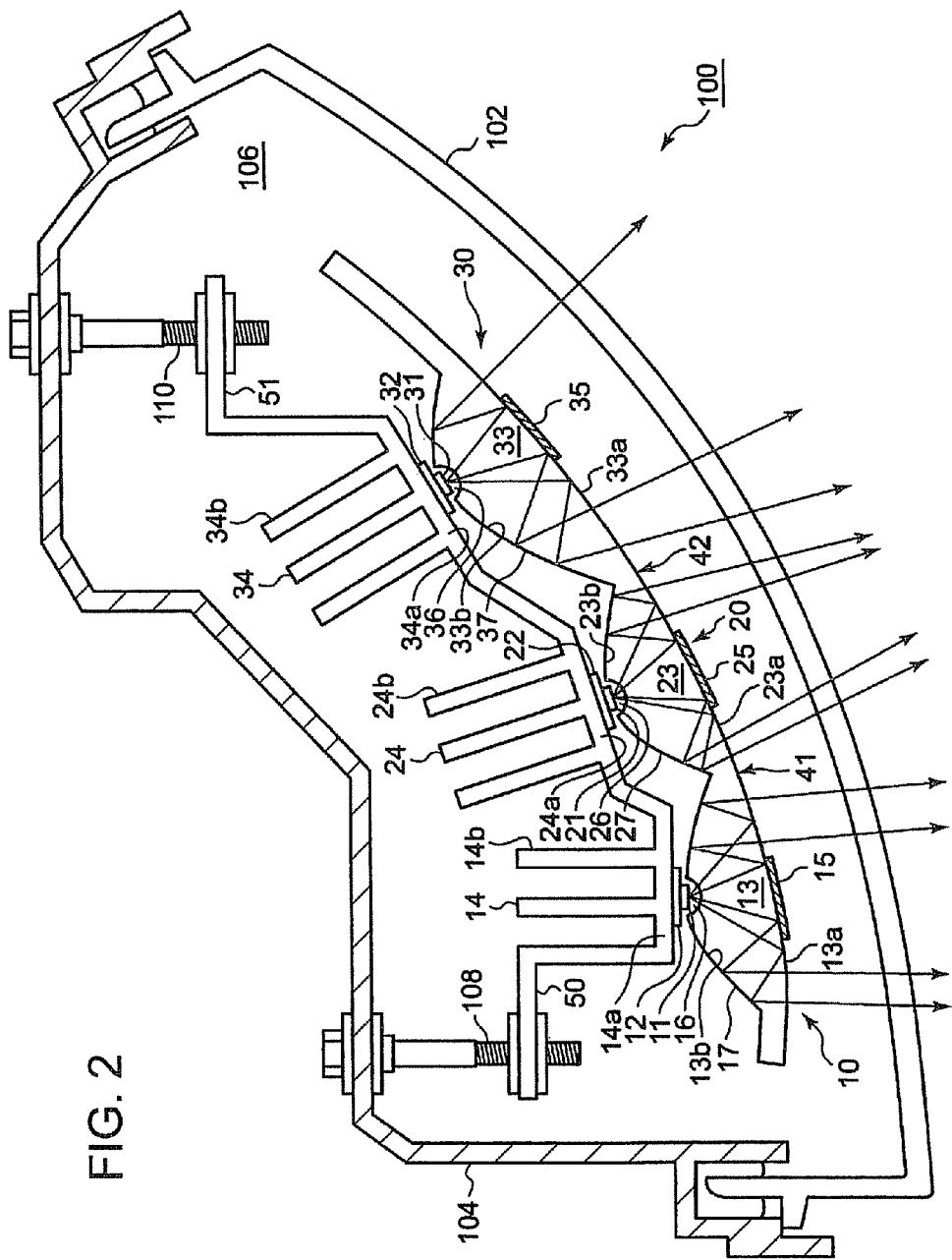
FIG. 2 is a horizontal cross-sectional view of the vehicular headlamp taken along the line 2-2 in FIG. 1.
Figure 3:
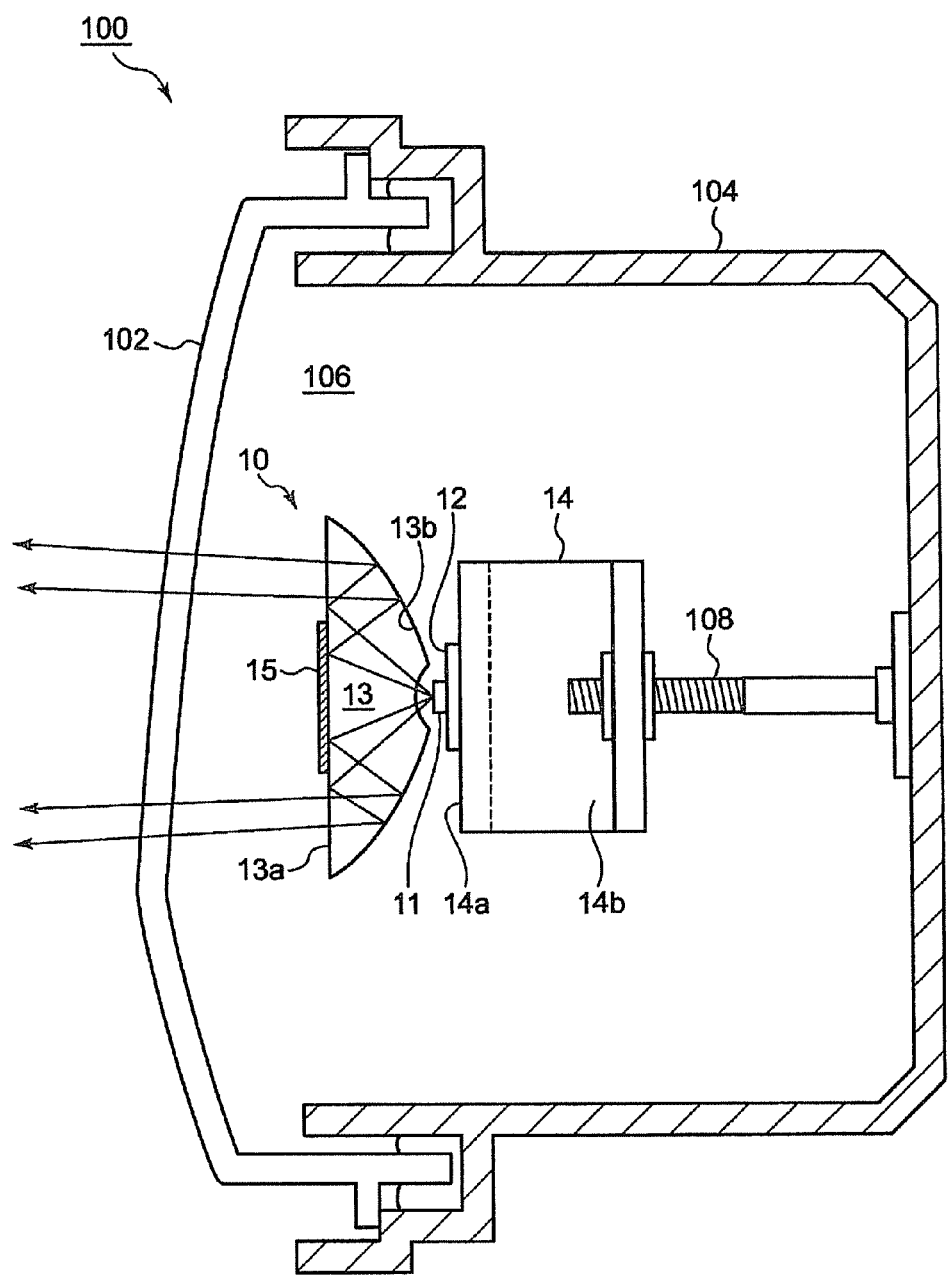
FIG. 3 is a vertical cross-sectional view of the vehicular headlamp taken along the line 3-3 in FIG. 1.

FIG. 1 is a front view showing a vehicular headlamp 100 according to one embodiment of the present invention. FIG. 2 is a horizontal cross-sectional view of the vehicular headlamp 100 taken along the line 2-2 in FIG. 1. FIG. 3 is a vertical cross-sectional view of the vehicular headlamp 100 according to the embodiment taken along the line 3-3 in FIG. 1.

The vehicular headlamp 100 shown in FIGS. 1 to 3 is a headlamp mounted on the left side of the front part of a vehicle. The vehicular headlamp 100 includes a lamp body 104 having a recessed portion that opens to the front of the lamp, and a transparent cover 102 covering the opening of the lamp body 104. The lamp body 104 and the cover 102 form a lamp chamber 106.

Three lamp units are provided in the lamp chamber 106. A first lamp unit 10 is provided nearest to the vehicle center in the vehicle width direction, a second lamp unit 20 is provided next to the first lamp unit 10, and a third lamp unit 30 is provided farthest from the vehicle center in the vehicle width direction, the second lamp unit 20 thus being provided in the middle or between the first and third lamp units 10 and 30. In the vehicular headlamp 100 according to this embodiment, the first lamp unit 10, the second lamp unit 20, and the third lamp unit 30 are formed integrally. The first lamp unit 10, the second lamp unit 20, and the third lamp unit 30 are attached to the lamp body 104 via a first aiming screw 108 and a second aiming screw 110.

Figure 4:
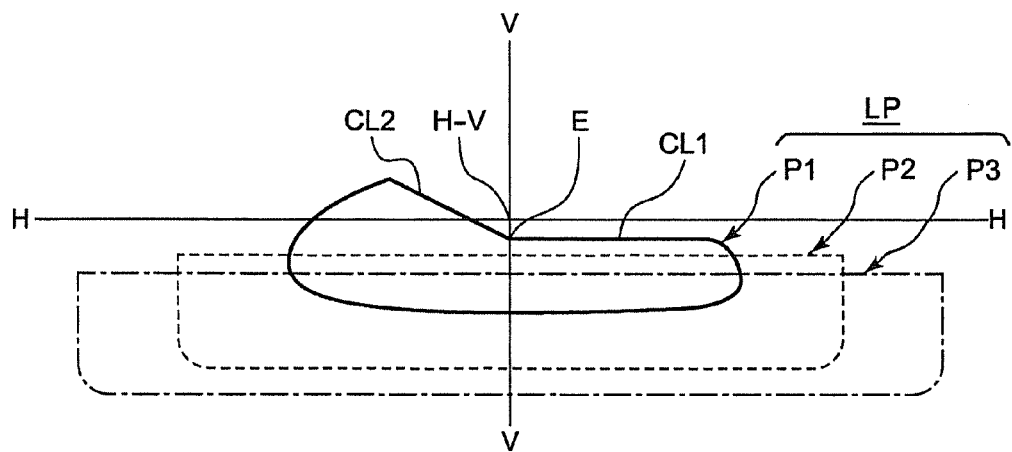
FIG. 4 is a diagram illustrating a light distribution pattern formed by the vehicular headlamp according to the embodiment of the present invention.

FIG. 4 is a diagram of a light distribution pattern that is formed by the vehicular headlamp 100 of the shown embodiment. FIG. 4 transparently shows a low-beam distribution pattern LP that is formed by the light radiated forward from the vehicular headlamp 100 on an imaginary vertical screen positioned 25 m ahead of the lamp.

As shown in FIG. 4, the low-beam distribution pattern LP has at its upper end a horizontal cut-off line CL1 that extends in the horizontal direction and an oblique cut-off line CL2 that extends in the upper left direction at a predetermined angle (e.g., 15°) from the horizontal cut-off line CL1. In the low-beam distribution pattern LP, an elbow point E that is an intersection of the horizontal cut-off line CL1 and the oblique cut-off line CL2 is located about 0.5° to 0.6° below a point H-V so as to be a vanishing point in the forward direction of the lamp.

The low-beam distribution pattern LP is formed as a combined light distribution pattern of a horizontal/oblique cut-off line forming pattern P1 (solid line), a first diffusion region forming pattern P2 (broken line), and a second diffusion region forming pattern P3 (chain line).

The horizontal/oblique cut-off line forming pattern P1 is a light distribution pattern that forms the horizontal cut-off line CL1 and the oblique cut-off line CL2. The horizontal/oblique cut-off line forming pattern P1 is formed by light radiation from the first lamp unit 10. The first diffusion region forming pattern P2 is a light distribution pattern forming a diffusion region of the low-beam distribution pattern LP and supplementarily forming the horizontal cut-off line CL1. The first diffusion region forming pattern P2 is formed by light radiation from the second lamp unit 20. The second diffusion region forming pattern P3 is a light distribution pattern having a wider radiation range in the horizontal direction than that of the first diffusion region forming pattern P2 and supplementarily forming the distribution region of the low-beam distribution pattern LP. The second diffusion region forming pattern P3 is formed by light radiation from the third lamp unit 30. The first lamp unit 10, the second lamp unit 20, and the third lamp unit 30 are thus configured to form different light distribution patterns.

A light distribution pattern to be formed can be selected according to, e.g., a driver's command. For example, only the first lamp unit 10 and the second lamp unit 20 can be lit to form a combined light distribution pattern of the horizontal/oblique cut-off line forming pattern P1 and the first diffusion region forming pattern P2.

Referring back to FIGS. 1 to 3, the structures of the first lamp unit 10, the second lamp unit 20, and the third lamp unit 30 will be described.

The first lamp unit 10 has a rectangular first LED 11, a first substrate 12, a first translucent member 13, and a first heat sink 14. The first LED 11 is provided on the first substrate 12, and it emits light by power supplied from the first substrate 12. The first substrate 12 is mounted on the first base portion 14a of the first heat sink 14. A plurality of heat radiation fins 14b are formed on the first base portion 14a of the first heat sink 14 to radiate heat generated by light emission of the first LED 11.

Light emitted from the first LED 11 is incident on the first translucent member 13 located in front of the first LED 11. The incident light is internally reflected on the front surface 13a of the first translucent member 13 and internally reflected again on the rear surface 13b of the first translucent member 13 and then emitted from the front surface 13a of the first translucent member 13. In other words, the light incident on the first translucent member 13 is internally reflected twice in the first translucent member 13, and then emitted from the first translucent member 13.

The first translucent member 13 is a molded member of a transparent synthetic resin such as acrylic resin. The front surface 13a of the first translucent member 13 is a gently curved, generally flat surface, and its rear surface 13b is generally formed in the shape of a paraboloid of revolution. A front reflecting portion 15 internally reflecting light emitted from the first LED 11 to the rear surface 13b is formed on the front surface 13a of the first translucent member 13. The front reflecting portion 15 is a circular area centered on the optical axis of the first lamp unit 10, and is mirror finished by aluminization, etc. The outer peripheral edge of the front reflecting portion 15 is positioned such that the incident angle of the light from the first LED 11 incident on the front surface 13a of the first translucent member 13 is substantially equal to the critical angle of the first translucent member 13. Thus, the light emitted from the first LED 11 is internally reflected by the mirror-finished front reflecting portion 15 and is totally internally reflected on the outer peripheral side that is not covered by the front reflecting portion 15.

An accommodating space 16 surrounding the first LED 11 is formed on the rear side of the first translucent member 13. This accommodating space 16 is formed in the shape of a hemispherical surface centered on the center of light emission of the first LED 11, and it functions as an incident portion that directs the light from the first LED 11 into the first translucent member 13. The accommodating space 16 can be filled with a transparent resin such as epoxy resin. In this case, the light emitted from the first LED 11 can be directed into the first translucent member 13 without being refracted on the hemispherical surface.

A rear reflecting portion 17 that reflects the reflected light from the front reflecting portion 15 as light emitted to the front of the vehicle is formed on the rear surface 13b of the first translucent member 13. For this rear reflecting portion 17, the entire rear surface 13b except the recessed portion having the shape of the hemispherical surface and forming the accommodating space 16 is mirror finished by aluminization, etc.

In the shown embodiment, the first LED 11 of the first lamp unit 10 is provided such that its long side is inclined with respect to the horizontal direction. The inclination angle of the first LED 11 with respect to the horizontal direction can be substantially equal to that of the oblique cut-off line CL2. The rear reflecting portion 17 formed on the rear surface 13b of the first translucent member 13 is divided into an oblique cut-off line forming region that forms the horizontal cut-off line CL1 and an oblique line forming region that forms the oblique cut-off line CL2. The horizontal/oblique cut-off line forming pattern P1 as shown in FIG. 4 can thus be formed by the single first lamp unit 10. Such a first lamp unit 10 is disclosed in detail in Japanese Patent Application Laid-Open (Kokai) No. 2011-100692 filed by the applicant of the present application.

The second lamp unit 20 will be described below. The second lamp unit 20 is provided so as to adjoin the first lamp unit 10, and is configured to form the first diffusion region forming pattern P2 shown in FIG. 4.

The second lamp unit 20 has a structure similar to the first lamp unit 10, and it includes a rectangular second LED 21, a second substrate 22, a second translucent member 23, and a second heat sink 24. The second LED 21 is provided on the second substrate 22, and emits light by power supplied from the second substrate 22. The second substrate 22 is mounted on a second base portion 24a of the second heat sink 24. A plurality of heat radiation fins 24b are formed on the second base portion 24a of the second heat sink 24 to radiate heat generated by light emission of the second LED 21.

Light emitted from the second LED 21 is incident on the second translucent member 23 located in front of the second LED 21. The incident light is internally reflected on the front surface 23a of the second translucent member 23 and internally reflected again on the rear surface 23b of the second translucent member 23 and then emitted from the front surface 23a of the second translucent member 23.

The second translucent member 23 has a different shape from the first translucent member 13, but it basically has a structure similar to the first translucent member 13. More specifically, the front surface 23a of the second translucent member 23 is a gently curved, generally flat surface, and its rear surface 23b is generally formed in the shape of a paraboloid of revolution. A circular front reflecting portion 25 internally reflecting the light emitted from the second LED 21 to the rear surface 23b is formed on the front surface 23a of the second translucent member 23 by, e.g., aluminization etc. The light emitted from the second LED 21 is internally reflected by the mirror-finished front reflecting portion 25 and is totally internally reflected on the outer peripheral side that is not covered by the front reflecting portion 25.

An accommodating space 26 surrounding the second LED 21 is formed on the rear side of the second translucent member 23. The accommodating space 26 can be filled with a transparent resin such as epoxy resin.

A rear reflecting portion 27 that reflects the reflected light from the front reflecting portion 25 as light emitted to the front of the vehicle is formed on the rear surface 23b of the second translucent member 23 by aluminization, etc.

In the shown embodiment, the second LED 21 of the second lamp unit 20 is provided such that its long side is parallel to the horizontal direction. The shape of the rear reflecting portion 27 formed on the rear surface 23b of the second translucent member 23 is designed such that the horizontal diffusion angle of the emitted light from the front surface 23a of the second translucent member 23 is larger than that of the first translucent member 13. The first diffusion region forming pattern P2 as shown in FIG. 4 can thus be formed.

The third lamp unit 30 will be described below. The third lamp unit 30 is provided so as to adjoin the second lamp unit 20, and it is configured to form the second diffusion region forming pattern P3 shown in FIG. 4.

The third lamp unit 30 has a structure similar to the first lamp unit 10 and the second lamp unit 20, and it includes a rectangular third LED 31, a third substrate 32, a third translucent member 33, and a third heat sink 34. The third LED 31 is provided on the third substrate 32 and emits light by power supplied from the third substrate 32. The third substrate 32 is mounted on a third base portion 34a of the third heat sink 34. A plurality of heat radiation fins 34b are formed on the third base portion 34a of the third heat sink 34 to radiate heat generated by light emission of the third LED 31.

Light emitted from the third LED 31 is incident on the third translucent member 33 located in front of the third LED 31. The incident light is internally reflected on the front surface 33a of the third translucent member 33 and internally reflected again on the rear surface 33b of the third translucent member 33 and then emitted from the front surface 33a of the third translucent member 33.

The third translucent member 33 has a different shape from the first translucent member 13, but it basically has a structure similar to the first translucent member 13 and the second translucent member 23. In other words, the front surface 33a of the third translucent member 33 is a gently curved, generally flat surface, and its rear surface 33b is generally formed in the shape of a paraboloid of revolution. A circular front reflecting portion 35 internally reflecting the light emitted from the third LED 31 to the rear surface 33b is formed on the front surface 33a of the third translucent member 33 by, e.g., aluminization etc. The light emitted from the third LED 31 is internally reflected by the mirror-finished front reflecting portion 35 and is totally internally reflected on the outer peripheral side that is not covered by the front reflecting portion 35.

An accommodating space 36 surrounding the third LED 31 is formed on the rear side of the third translucent member 33. The accommodating space 36 can be filled with a transparent resin such as epoxy resin.

A rear reflecting portion 37 that reflects the reflected light from the front reflecting portion 35 as light emitted to the front of the vehicle is formed on the rear surface 33b of the third translucent member 33 by aluminization etc.

In the shown embodiment, the third LED 31 of the third lamp unit 30 is provided such that its long side is parallel to the horizontal direction. The shape of the rear reflecting portion 37 formed on the rear surface 33b of the third translucent member 33 is designed such that the horizontal diffusion angle of the emitted light from the front surface 33a of the third translucent member 33 is larger than that of the second translucent member 23. The second diffusion region forming pattern P3 as shown in FIG. 4 can thus be formed.

In the vehicular headlamp 100 according to the shown embodiment, the translucent member of each lamp unit is coupled to the translucent member of the adjoining lamp unit at their ends in the vehicle width direction. More specifically, as shown in FIG. 2, the outer end, in the vehicle width direction, of the first translucent member 13 is coupled to the inner end, in the vehicle width direction, of the adjoining second translucent member 23. The portion where the first translucent member 13 and the second translucent member 23 are coupled together is referred to as a "first coupled portion 41." The outer end of the second translucent member 23, in the vehicle width direction, is coupled to the inner end, in the vehicle width direction, of the adjoining third translucent member 33. The portion where the second translucent member 23 and the third translucent member 33 are coupled together is referred to as a "second coupled portion 42."

The first translucent member 13, the second translucent member 23, and the third translucent member 33 are integrally molded by a transparent resin material such as acrylic resin. The front surface 13a of the first translucent member 13, the front surface 23a of the second translucent member 23, and the front surface 33a of the third translucent member 33 are formed in the shape of a gently curved, continuous single flat surface as shown in FIGS. 1 and 2. Integrally molding the first translucent member 13, the second translucent member 23, and the third translucent member 33 can implement a lamp unit having an integral appearance of sophisticated design. Moreover, integrally molding the three translucent members reduces the number of parts, which is advantageous in terms of cost.

As shown in FIG. 2, the first coupled portion 41 and the second coupled portion 42 are thinner than the remaining portion of the translucent members. The thickness of the first coupled portion 41 and/or the second coupled portion 42 may be set so that light can be transmitted from one of the coupled translucent members to the other. For example, light from the first LED 11 of the first lamp unit 10 can be transmitted through the first coupled portion 41 and the second coupled portion 42, and light from the second LED 21 of the second lamp unit 20 can be transmitted through the first coupled portion 41 and the second coupled portion 42. However, the light distribution pattern that is supposed to be formed by each lamp unit can be changed as the amount of light that is transmitted through the coupled portion increases. Accordingly, the thickness of the first coupled portion 41 and the second coupled portion 42 is set to an appropriate value so as not to affect the light distribution patterns.

In the case where the coupled portions are formed so that light can be transmitted therethrough, light from the first LED 11 and the second LED 21 is transmitted through the second coupled portion 42 into the third translucent member 33 when, e.g., only the first lamp unit 10 and the second lamp unit 20 are lit. This can give such an appearance as if the third lamp unit 30 emitted light and the light-emitting area were expanded.

In the shown embodiment, the first heat sink 14, the second heat sink 24, and the third heat sink 34 are formed integrally. More specifically, the outer end, in the vehicle width direction, of the first base portion 14a of the first heat sink 14 is coupled to the inner end, in the vehicle width direction, of the second base portion 24a of the adjoining second heat sink. The outer end, in the vehicle width direction, of the second base portion 24a of the second heat sink 24 is coupled to the inner end, in the vehicle width direction, of the third base portion 34a of the adjoining third heat sink 34. The first LED 11, the second LED 21, and the third LED 31 are thus supported by an integral common support member (heat sink). This integral heat sink also supports the first translucent member 13, the second translucent member 23, and the third translucent member 33 that are formed integrally.

A first aiming screw attaching portion 50 to which the first aiming screw 108 is attached is formed in the inner end, in the vehicle width direction, of the first base portion 14a of the first heat sink 14, and a second aiming screw attaching portion 51 to which the second aiming screw 110 is attached is formed in the outer end, in the vehicle width direction, of the third base portion 34a of the third heat sink 34. The attitude of the first lamp unit 10, the second lamp unit 20, and the third lamp unit 30 can be integrally changed by rotating the first aiming screw 108 and the second aiming screw 110, so that aiming of the first lamp unit 10, the second lamp unit 20, and the third lamp unit 30 can be collectively performed when, e.g., the vehicle is shipped or inspected.

Although the first translucent member 13, the second translucent member 23, and the third translucent member 33 are integrally molded in the above embodiment, the translucent members can be formed as separate members and provided so as to be coupled together at their ends in the vehicle width direction. In this case, the interface of the coupled portions may be subjected to such a treatment as formation of an antireflection film so that light incident on the interface does not reflect in unintended directions.

Figure 5:
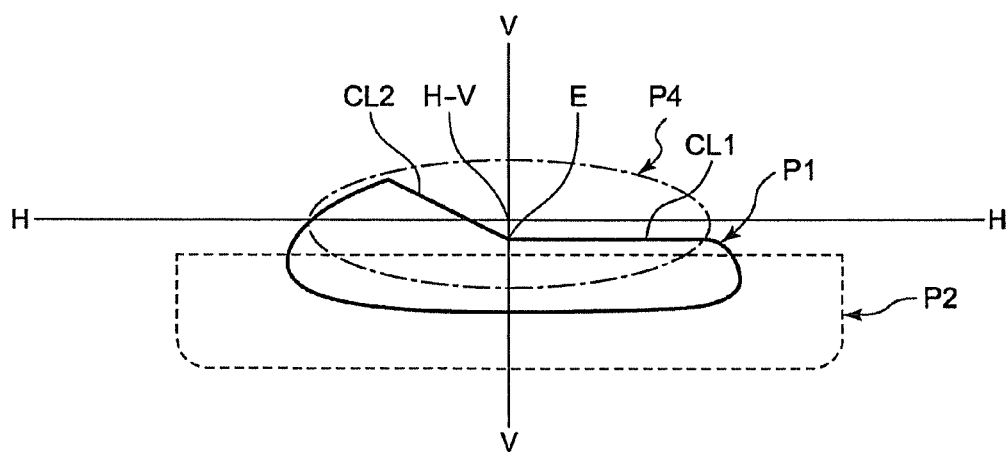
FIG. 5 is a diagram illustrating another light distribution pattern formed by the vehicular headlamp according to the embodiment.

FIG. 5 is a diagram illustrating another light distribution pattern formed by the vehicular headlamp 100 according to the embodiment. The light distribution pattern shown in FIG. 5 is different from that shown in FIG. 4 in that the light distribution pattern of FIG. 5 has a high-beam forming pattern P4 instead of the second diffusion region forming pattern P3. The high-beam forming pattern P4 is formed by light radiation from the third lamp unit 30. The high-beam forming pattern P4 as shown in FIG. 5 can be formed by changing the direction of the optical axis of the third lamp unit 30 and the shape of the rear reflecting portion 37.

When a low-beam distribution pattern is formed by the vehicular headlamp 100 capable of forming the light distribution pattern shown in FIG. 5, the first lamp unit 10 and the second lamp unit 20 are lit, and the third lamp unit 30 is unlit to form a combined light distribution pattern of the horizontal/oblique cut-off line forming pattern P1 and the first diffusion region forming pattern P2. On the other hand, when forming a high-beam distribution pattern, all of the first lamp unit 10, the second lamp unit 20, and the third lamp unit 30 are lit to form a combined light distribution pattern of the horizontal/oblique cut-off line forming pattern P1, the first diffusion region forming pattern P2, and the second diffusion region forming pattern P3. Thus, the light distribution pattern that is formed by the vehicular headlamp 100 according to the shown embodiment is not particularly limited, and various light distribution patterns can be formed.

FIG. 6 is a horizontal cross-sectional view showing a vehicular headlamp 600 according to another embodiment of the present invention. Since the configuration of the second lamp unit 20 and the third lamp unit 30 of the vehicular headlamp 600 shown in FIG. 6 is similar to that in the vehicular headlamp 100 shown in FIG. 2 etc., detailed description thereof will be omitted.

In the vehicular headlamp 600 of the embodiment of FIG. 6, a first lamp unit 610 that forms the horizontal/oblique cut-off line forming pattern P1 is different in configuration from the first lamp unit 10 shown in FIG. 2 etc. The first lamp unit 610 is a so-called projector-type lamp unit, and it includes a first LED 611 that emits light upward, a reflector 618 that reflects the light from the first LED 611, a shade (not shown since it is hidden from view by the reflector 618) that blocks part of the reflected light from the reflector 618 to form the horizontal cut-off line CL1 and the oblique cut-off line CL2, and a projection lens 613 that projects the light having passed through the shade to the front of the lamp. The first LED 611 and the reflector 618 are supported by a first heat sink 614.

In the embodiment of FIG. 6, the projection lens 613 of the first lamp unit 610 is molded by a transparent resin material such as acrylic resin integrally with the second translucent member 23 of the second lamp unit 20 and the third translucent member 33 of the third lamp unit 30. In other words, the outer end, in the vehicle width direction, of the projection lens 613 in the vehicle width direction is coupled to the inner end, in the vehicle width direction, of the second translucent member 23 via a first coupled portion 641. The thickness of the first coupled portion 641 can be set so that the light can be transmitted from the first lamp unit 610 to the second lamp unit 20.

As in the embodiment of FIG. 6, integrally molding the projection lens 613, the second translucent member 23, and the third translucent member 33 can implement a lamp unit having an integral appearance of sophisticated design. Moreover, the number of parts is reduced, which is advantageous in terms of the manufacturing cost.

The present invention is described above based on the embodiments. It should be understood by those skilled in the art that these embodiments are by way of example only, and various modifications can be made to the combination of the components and the treatment processes and such modifications are within the scope of the present invention.

The invention claimed is:
1. A vehicular lamp comprising:
a first lamp unit provided with a first light source and a first translucent member that receives incident light from the first light source and is configured so that the incident light is internally reflected on a front surface of the translucent member and internally reflected on a rear surface of the translucent member and then emitted from the front surface of the translucent member; and
a second lamp unit provided with a second light source and a second translucent member that receives incident light from the second light source and that is configured so that the incident light is internally reflected on a front surface of the translucent member and internally reflected on a rear surface of the translucent member and then emitted from the front surface of the translucent member, wherein the first translucent member and the second translucent member are coupled together at their ends in a vehicle width direction, and a coupled portion of the first translucent member and the second translucent member is configured so that light is transmitted from one of the translucent members to the other.

2. The vehicular lamp according to claim 1, wherein the first translucent member and the second translucent member are integrally molded by a resin material.

3. The vehicular lamp according to claim 1, wherein the first light source and the second light source are supported by a common support member.

4. The vehicular lamp according to claim 1, wherein the first translucent member and the second translucent member are configured to form different light distribution patterns.

5. The vehicular lamp according to claim 1, further comprising:

a third lamp unit provided with a third light source and a third translucent member that receives incident light from the third light source and is configured so that the incident light is internally reflected on a front surface of the translucent member and internally reflected on a rear surface of the translucent member and then emitted from the front surface of the translucent member.

6. A vehicular lamp comprising a plurality of lamp units, wherein one of the plurality of lamp units is provided with a first light source and a first translucent member that receives incident light from the first light source and is configured so that the incident light is internally reflected on a front surface of the translucent member and internally reflected on a rear surface of the translucent member and then emitted from the front surface of the translucent member; and another one of the plurality of lamp units which is provided positionally next to said another one of the plurality of lamp unit is provided with a second light source and a second translucent member that receives incident light from the second light source and is configured so that the incident light is internally reflected on a front surface of the translucent member and internally reflected on a rear surface of the translucent member and then emitted from the front surface of the translucent member, wherein the first translucent member and the second translucent member are coupled together at their ends in a vehicle width direction, and a coupled portion of the first translucent member and the second translucent member is configured so that light is transmitted from one of the translucent members to the other.

* * * * *